United States Patent [19]
Avila et al.

[11] Patent Number: 5,620,542
[45] Date of Patent: Apr. 15, 1997

[54] APPARATUS AND METHOD FOR SEALING VALVED BAGS TRANSPORTED BY A CONVEYOR

[75] Inventors: Michael R. Avila, West Jordan; Robert G. Kelley, South Jordan; Don G. Giles, Salt Lake City; Jerry L. Aldridge, Grantsville, all of Utah

[73] Assignee: Stone Container Corporation, Chicago, Ill.

[21] Appl. No.: 354,988

[22] Filed: Dec. 13, 1994

[51] Int. Cl.⁶ .................................................. B32B 31/16
[52] U.S. Cl. .................. 156/73.1; 156/308.4; 156/580.1; 493/206; 493/209; 493/929; 53/374.9; 53/375.9; 53/DIG. 2
[58] Field of Search ................... 156/73.1, 69, 308.4, 156/538, 539, 556, 557, 580.1, 580.2; 493/206, 209, 213, 929; 53/384.1, DIG. 2, 373.7, 374.8, 374.9, 375.6, 375.9

[56] References Cited

U.S. PATENT DOCUMENTS

| | | | |
|---|---|---|---|
| 1,963,730 | 6/1934 | Allison | 226/56 |
| 2,932,140 | 4/1960 | Drese | 53/266 |
| 3,294,616 | 12/1966 | Linsley et al. | 156/580 |
| 3,513,622 | 5/1970 | Timmerbeil | 53/77 |
| 3,607,534 | 9/1971 | Gutman | 493/213 X |
| 3,646,856 | 3/1972 | Worndl | 493/213 X |
| 3,648,429 | 3/1972 | Davidson et al. | 53/77 |
| 4,145,236 | 3/1979 | Neumayer et al. | 156/73.1 |
| 4,159,220 | 6/1979 | Bosche et al. | 156/73.1 |
| 4,367,620 | 1/1983 | Fox | 53/479 |
| 4,394,207 | 7/1983 | Berthelsen et al. | 156/578 |
| 4,537,016 | 8/1985 | Shanklin et al. | 53/493 |
| 5,087,235 | 2/1992 | Lafleur | 493/929 X |
| 5,244,532 | 9/1993 | Wadium et al. | 156/580.1 |
| 5,304,265 | 4/1994 | Keeler | 156/64 |

*Primary Examiner*—James Sells
*Attorney, Agent, or Firm*—Dick and Harris

[57] ABSTRACT

A method and apparatus for sealing a valved bag transported by a conveyor. The valved bag has a body with a longitudinal axis, a center of gravity, and a sealable valve. At least a portion of the sealable valve protrudes from the body in a substantially perpendicular orientation relative to the longitudinal access. The apparatus includes a conveyor for transporting the valved bag in a direction of travel substantially parallel to its longitudinal access. A stop member stops the transportation of the valved bag when the sealable valve is aligned with a sealing area. A ram member positions the valved bag to dispose at least a portion of the sealable valve into the sealing area. An ultrasonic horn and anvil engage and seal the sealable valve. The stop member is removed from the path of the sealed bag, allowing it to resume transportation along the conveyor.

17 Claims, 2 Drawing Sheets

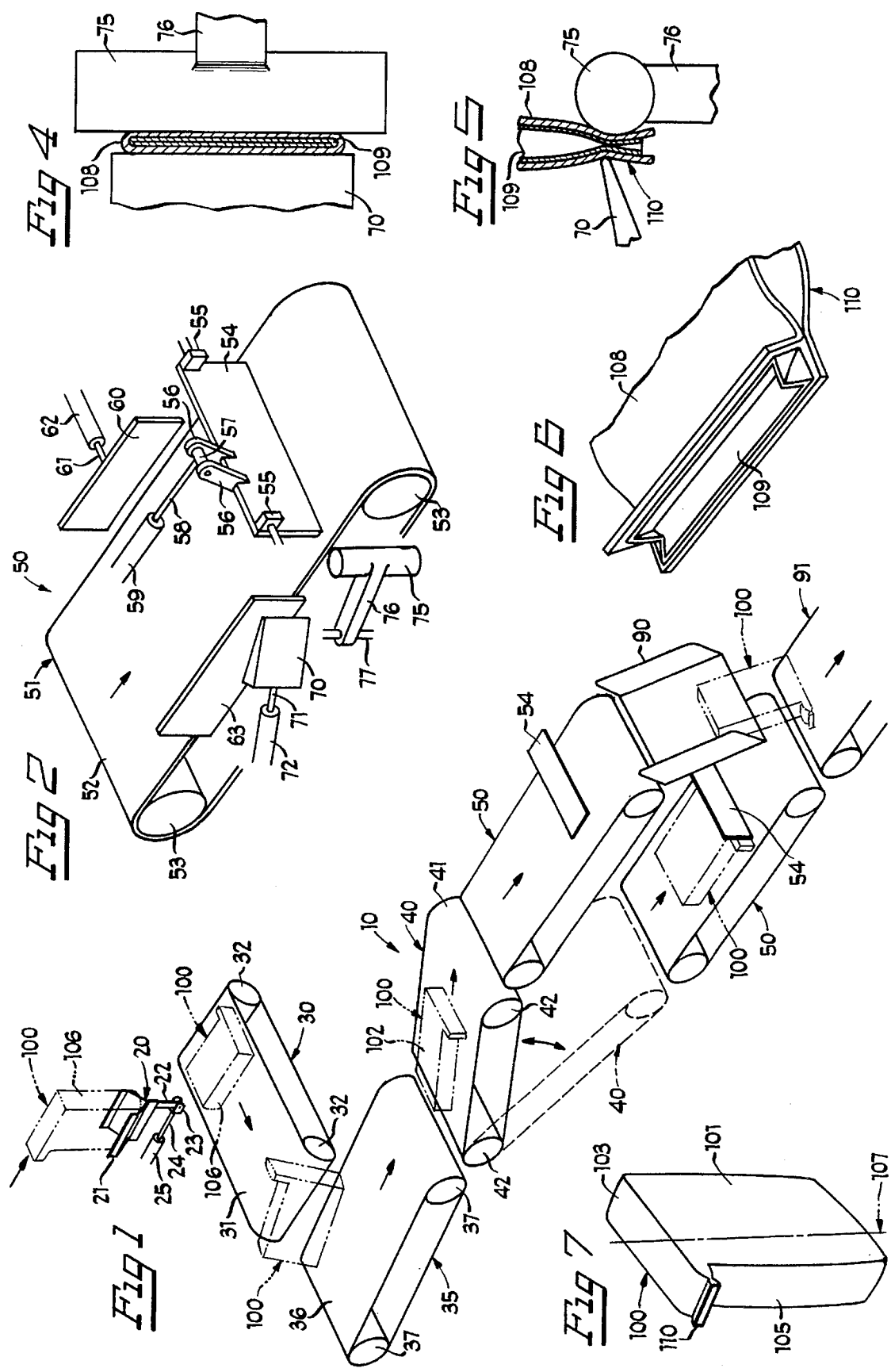

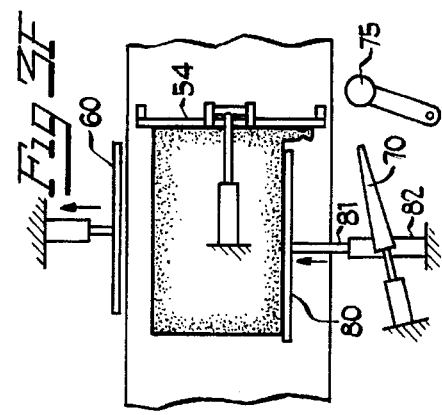
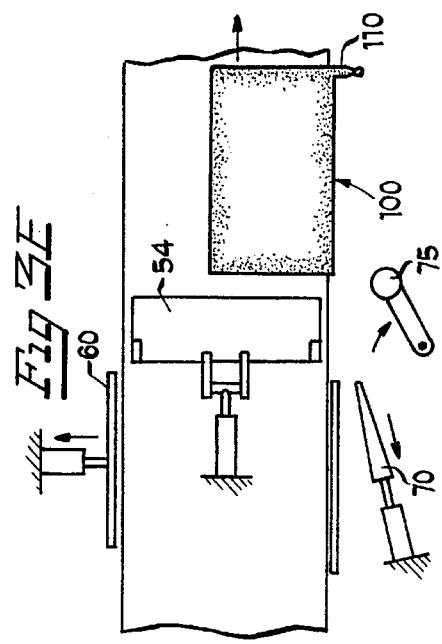
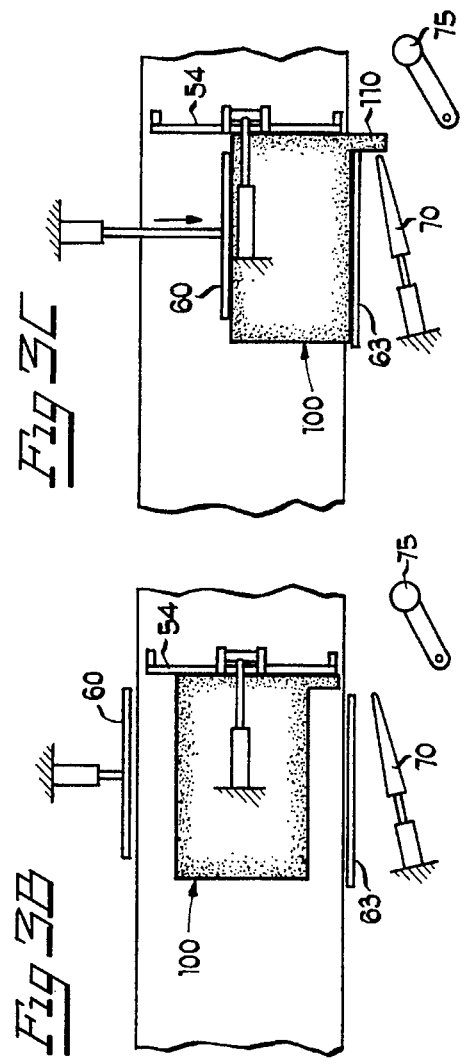
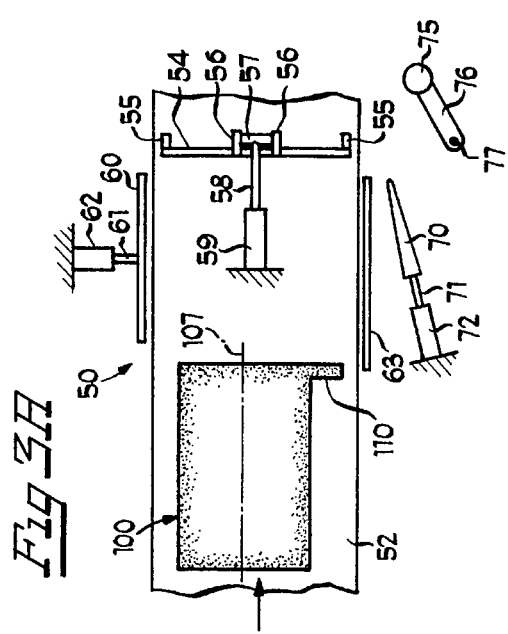

APPARATUS AND METHOD FOR SEALING VALVED BAGS TRANSPORTED BY A CONVEYOR

BACKGROUND OF THE INVENTION

The present invention relates in general to a bag sealing apparatus and method, and, more particularly, to an apparatus and method for sealing a valved bag transported by a conveyor.

Sealable cartons and containers, and apparatuses and methods for sealing them, have been known in the art for quite some time. One example of a prior-art apparatus and method for sealing containers via ultrasonic vibration is disclosed within U.S. Pat. No. 4,159,220 to Bosche et al. Another example of an ultrasonic apparatus for sealing containers is disclosed within U.S. Pat. No. 5,244,532 to Wadium et al.

Typically, in these prior art systems, containers are transported in an upright, vertical fashion along a conveyor, until they reach a sealing station. Often the container must be supported in this upright orientation as it is carried along the conveyor. Within the sealing station, a portion of the container to be sealed is clamped within a heat sealing or ultrasonic vibration sealing apparatus. While such systems have worked acceptably for relatively small or lightweight containers, they are more difficult to apply to heavier, larger, or more cumbersome containers. For these containers, it is relatively difficult to transport them vertically, inasmuch as relatively large, sophisticated, or expensive supporting or holding structures are required to maintain the containers in a vertical orientation, with their centers of gravity carried distally from the conveyor. Moreover, in some such prior art systems, containers must be manually loaded onto, and off-loaded from, these vertical supporting or holding structures.

Accordingly, it is an object of the present invention to provide a method and apparatus for sealing a container placed flat upon a conveyor, in a low center of gravity orientation.

It is another object of the present invention to provide an automated apparatus and method for sealing a container, wherein the container need not be supported in a vertical orientation; and requiring less manual labor associated therewith.

It is yet another object of the present invention to provide an apparatus and method for sealing a valved bag having a sealable valve protruding in a substantially perpendicular orientation with respect to a longitudinal axis of the bag.

These and other objects and features of the present invention will become apparent in light of the present specification, claims and drawings.

SUMMARY OF THE INVENTION

The present invention comprises a bag sealing apparatus for sealing a valved bag transported by a conveyor. The valved bag has a body with a longitudinal axis, a center of gravity, and a sealable valve. At least a portion of the sealable valve protrudes from the body in a substantially perpendicular orientation relative to the longitudinal axis.

Orienting means are provided for orienting the valved bag on the conveyor, so as to minimize the distance between the center of gravity of the valved bag relative to a surface of the conveyor.

Transporting means are provided for transporting the valved bag along the conveyor in a direction of travel substantially parallel to the longitudinal axis of the valved bag. Also provided are stopping means for stopping the transporting of the valved bag along the conveyor when the sealable valve is substantially aligned with a sealing area.

Positioning means for positioning the valved bag to dispose at least a portion of the sealable valve into the sealing area are provided. Also provided are sealing means for sealing the sealable valve when at least a portion of the sealable valve is disposed within the sealing area. Transport resumption means resume the transporting of the valved bag on the conveyor, following sealing of the sealable valve.

In a preferred embodiment, the stopping means comprises a stop member positionable from a substantially open position to a substantially closed position. The engagement of the valved bag with the stop member in its substantially closed position temporarily stops forward travel of the valved bag, when the sealable valve is substantially aligned with the sealing area.

The positioning means preferably comprises a ram member moveable from a substantially undeployed position to a substantially deployed position. Movement of the ram member from its substantially undeployed position to its substantially deployed position in turn positions the valved bag, to dispose at least a portion of the sealable valve into the sealing area.

Also, in a preferred embodiment, the sealing means comprises an ultrasonic horn and an anvil. At least one of the ultrasonic horn and anvil is moveable from a substantially non-engaging position to a substantially engaging position, relative to the sealable valve. Engagement of the sealable valve by the ultrasonic horn and anvil, and actuation of the ultrasonic horn, serves to substantially seal the sealable valve. In a preferred embodiment, the anvil is pivotable from a substantially non-engaging position to a substantially engaging position relative to the sealable valve. The anvil is in a forward path of the sealable valve when in its substantially engaging position, and is removed from the forward path of the sealable valve when in its substantially non-engaging position.

The transport resumption means preferably comprises a stop member positionable from a substantially closed position to a substantially opened position. Movement of the stop member from its substantially closed position to its substantially opened position permits a valved bag abutting the stop member to resume its travel along the conveyor. In another preferred embodiment, the bag sealing apparatus further includes repositioning means for repositioning the valved bag to remove at least a portion of the sealable valve from the sealing area. The repositioning means preferably comprises a ram member moveable from a substantially undeployed position to a substantially deployed position. Movement of this ram member from its substantially undeployed position to its substantially deployed position repositions the valve bag and, in turn, removes at least a portion of the sealable valve from the sealing area.

Also in a preferred embodiment, the bag sealing apparatus includes a plurality of sealing stations, and delivery means for delivering the valved bags to the sealing stations are provided. In a preferred embodiment, the plurality of sealing stations comprises two sealing stations, and the delivery means comprises a pivotable conveyor section alternately alignable with each of the two sealing stations.

In a preferred embodiment, the bag sealing apparatus further includes dropping means for dropping the valved bag onto the conveyor. Dropping of the valved bags serves to substantially expel residue from, and substantially close, the sealable valve. This dropping also automatically positions the valved bag in its low center of gravity orientation.

It is contemplated, for all the preferred embodiments, that the operation of the present bag sealing apparatus be governed by one or more conventional programmable controllers. Coupled to the programmable controllers are conventional actuators, such as the stationary sleeve and piston actuators employed to actuate the stop member, ram member, ultrasonic horn and anvil. Moreover, conventional proximity centers, such as optical sensors, are employed to track the movement of valved bags along the conveyors of the present bag sealing apparatus, in order to determine when actuation of these moveable members and devices by the programmable controllers is appropriate in order to perform the sequence of steps of the sealing process.

Moreover, in all preferred embodiments, additional conveyors are employed to carry sealed bags from the sealing stations to an off-loading and shipment consolidation area.

The present invention further comprises a method for sealing a valved bag transported by a conveyor. The valved bag has a body with a longitudinal axis, a center of gravity, and a sealable valve. At least a portion of the sealable valve protrudes from the body in a substantially perpendicular orientation relative to the longitudinal axis.

In a preferred embodiment, the method comprises the steps of: 1) orienting the valved bag on the conveyor so as to minimize the distance between the center of gravity of the valved bag relative to a surface of the conveyor; 2) transporting the valved bag along the conveyor in a direction of travel substantially parallel to the longitudinal axis of the valved bag; 3) stopping the transporting of the valved bag on the conveyor when the sealable valve is substantially aligned with a sealing area; 4) positioning the valved bag to dispose at least a portion of the protruding sealable valve into the sealing area; 5) sealing the sealable valve; and 6) resuming the travel of the valved bag along the conveyor.

In a preferred embodiment of the invention, the sealing area includes an ultrasonic horn and anvil, and the step of sealing the sealable valve comprises the steps of: 1) clamping at least a portion of the sealable valve between the ultrasonic horn and the anvil; 2) energizing the ultrasonic horn to seal the sealable valve; 3) deenergizing the ultrasonic horn; and 4) unclamping at least one of the ultrasonic horn and the anvil from the at least a portion of the sealable valve.

Also in a preferred embodiment, the step of clamping at least a portion of the sealable valve between the ultrasonic horn and the anvil comprises the steps of: 1) pivoting the anvil into a forward path of at least a portion of the sealable valve and into engagement with a first side of the sealable valve; and 2) engaging the ultrasonic horn with a second, opposing side of the sealable valve.

In one preferred embodiment, the step of unclamping at least one of the ultrasonic horn and anvil from the at least a portion of the sealable valve comprises the steps of: 1) disengaging the ultrasonic horn from a second side of the sealable valve; and 2) removing the anvil from a forward path of the at least a portion of the sealable valve.

In another preferred embodiment, the step of resuming the transporting of the valved bag on the conveyor is preceded by a further step of repositioning the valved bag to remove the at least a portion of the protruding sealable valve from the sealing area.

Also, in a preferred embodiment of the invention, the method further includes the step of orienting the valved bag on the conveyor with the distance between the center of gravity of the valved bag minimized relative to the surface of the conveyor further includes the step of dropping the valved bag onto the conveyor. This dropping of the valved bag serves to substantially expel residue from and substantially close the sealable valve, while automatically positioning the valved bag in the low center of gravity orientation.

BRIEF DESCRIPTION OF THE DRAWINGS

FIG. 1 of the drawings is a perspective view of the bag sealing apparatus, showing, in particular, the filling station and the pivotable conveyor section alternately alignable with each of two sealing stations, with components of the sealing station not shown;

FIG. 2 of the drawings is a perspective view of a sealing station, showing, in particular, the stop member, the ram member, the ultrasonic horn, and the anvil;

FIG. 3A is a top plan view of a sealing station, showing, in particular, a valved bag transported along the conveyor in a low center of gravity orientation;

FIG. 3B is a top plan view of the sealing station of FIG. 3A, showing, in particular, the stopping of the transportation of a valved bag along the conveyor, by engagement of the valved bag with the stop member;

FIG. 3C is a top plan view of the sealing station of FIG. 3A, showing, in particular, the ram member in its substantially deployed position, positioning the valved bag to dispose the sealable valve into the sealing station;

FIG, 3D of the drawings is a top plan view of the sealing station of FIG. 3A, showing, in particular, the clamping of the sealable valve between the ultrasonic horn and the anvil;

FIG. 3E of the drawings is a top plan view of the sealing station of FIG. 3A, showing, in particular, the resumption of travel of the valved bag following sealing of the sealable valve to an off-loading and shipment consolidation area;

FIG. 3F of the drawings is a top plan view of a sealing station of another preferred embodiment of the present invention, showing, in particular, an additional ram member repositioning the valved bag to remove the sealed valve from the sealing area;

FIG. 4 of the drawings is a fragmentary side view of the ultrasonic horn and the anvil, showing, in particular, the sealing of a valve, shown in section;

FIG. 5 of the drawings is a fragmentary, top plan view of the ultrasonic horn and the anvil, showing, in particular, the sealing of a valve, shown in section;

FIG. 6 of the drawings is a fragmentary view of a valved bag showing, in particular, a valve sealed by the present invention; and FIG. 7 of the drawings is a perspective view of an upright sealed valved bag.

DETAILED DESCRIPTION OF THE DRAWINGS

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

The present bag sealing apparatus 10 is shown in FIG. 1 as comprising filling section 20, conveyor 30, conveyor 35, pivotable conveyor section 40, two sealing stations 50, chute 90, and conveyor 91. The conveyors continually move in the direction of their associated arrows, shown in FIGS. 1–3. To more clearly depict the operation and structure of the present bag sealing apparatus 10, frame members, supports, and conveyor side railings have been omitted from the figures.

A sealable valved bag 100, sealable by the present bag sealing apparatus, is shown in FIG. 7 and FIG. 1 as comprising front surface 101, back surface 102, top surface 103, side surface 105, side surface 106, longitudinal axis 107, and sealable valve 110. The particulars of such a sealable valved bag are disclosed within U.S. patent application Ser. No. 08/240,131, filed May 10, 1994 and assigned to a common assignee with the present invention. Sealable valve 110 protrudes from side surface 105, proximate top surface 103 and substantially perpendicular to longitudinal axis 107. As shown in FIG. 6, valved bag 100 is typically constructed from an outer ply 108 and an inner ply 109. Outer ply 108 is preferably constructed of a relatively strong paper or paperboard material, such as kraft paper. Inner ply 109 is preferably constructed from a heat-sealable or ultrasonic-reactive material, such as a thermoplastic material. Inner ply 109 may extend throughout the entire interior surface of valved bag 100. Alternatively, inner ply 109 may be employed solely within all or a portion of sealable valve 110. Moreover, inner ply 109 may alternatively be replaced with a coating of heat-sealable or ultrasonic-reactive material on the inner surface of outer ply 108, rather than comprising a separate inner ply.

As shown in FIG. 1, filling section 20 includes Y-shaped support member 21, arm 22, pivot 23, piston 24, and stationary cylinder 25. Piston 24 and stationary cylinder 25, as well as the other piston-cylinder devices shown and described herein, may comprise conventional pneumatically-actuated, hydraulically-actuated, or electronically-actuated components. Y-shaped support member 21 holds valved bag 100 in an upright orientation as the bag is being filled. During this time, material is inserted into bag 100 through valve 110. When the filling process is complete, piston 24 is retracted within stationary cylinder 25. This, in turn, causes arm 22 and support member 21 to rotate at pivot 23, until arm 22 is substantially collinear with piston 24. This, in turn, causes bag 100 to drop onto the surface of conveyor 30. Piston 24 is then extended from cylinder 25, returning Y-shaped support member 21 to its upright position in order to support the next bag 100 to be filled.

Initially, side surface 106 of bag 100 contacts belt 31 of conveyor 30. Inasmuch as belt 31 is moved by rollers 32 in a direction substantially perpendicular to longitudinal axis 107 of bag 100, and inasmuch as bag 100 is relatively unstable in this orientation, bag 100 is rotated, so as to lie substantially flat, with back surface 102 adjacent belt 31. Bag 100 is thus oriented, and carried by conveyor 30, in a low center of gravity orientation, with minimal distance between the center of gravity of valved bag 100 and the surface of the conveyor.

If valved bag 100 includes a valve 110 which is of the self-sealing variety, the dropping of bag 100 onto conveyor 30 further serves to substantially close sealable valve 110, and to expel residue from the sealable valve.

Bag 100 is then transported from conveyor 30 to conveyor 35, which comprises belt 36 and rollers 37. Belt 36 of conveyor 35 is positioned at a lower height than conveyor 30, with belt 36 traveling in a substantially perpendicular orientation relative to belt 31. Side surface 106 of valved bag 100 initially contacts belt 31, with the forward momentum of valved bag 100 causing the bag to roll over, with front surface 101 of bag 100 adjacent belt 36, again in a low center of gravity orientation, with the center of gravity of the valved bag minimized relative to the surface of conveyor 35.

Bag 100 is carried along conveyor 35, in a direction of travel substantially parallel to longitudinal axis 107. Upon reaching the end of conveyor 35, bag 100 is transferred to pivotable conveyor section 40, comprising belt 41 and rollers 42.

As shown in FIG. 1, conveyor section 40 is pivotable from a raised position, aligned with one sealing station 50, to a lowered position, aligned with the other sealing station 50. As successive bags 100 are carried onto pivotable conveyor section 40 from conveyor 35, pivotable conveyor section 40 alternates between its lowered and raised orientations, so as to alternatively transport bags to each of the two sealing stations 50. Inasmuch as the bag sealing operation within sealing station 50 typically takes a longer amount of time than the filling operation within filling section 20, this alternation of bags between a plurality of sealing stations increases the overall throughput of the sealing process, to prevent this process from becoming a "bottleneck" in the overall filling and sealing operation.

A conventional proximity sensor, such as an optical sensor, may be employed to detect the transition of bags from pivotable section 40 to sealing stations 50, and, in turn, to trigger the pivoting of pivotable conveyor section 40 between its raised and lowered orientations. Moreover, conventional control equipment, such as a programmable controller, may be coupled to the sensors, cylinders, and pivoting conveyor, in order to govern the sequencing and actuation of the cylinders and pivoting conveyor. For example, with respect to a step described in detail below, a proximity sensor signals a programmable controller that a valved bag 100 has been carried along conveyor belt 52 into abutting contact with stop member 54, as shown in FIG. 3B. In response to this input, the programmable controller signals piston 61 to extend from stationary cylinder 62, actuating ram member 60, as shown in FIG. 3C.

Although FIG. 1 illustrates the use of two sealing stations, a single sealing station may be employed, if it is desired to reduce the cost and throughput of bag sealing apparatus 10. Of course, in such a configuration, conveyor section 40 will not pivot, but will remain permanently aligned with a single sealing station 50. Moreover, it is also contemplated that additional sealing stations, in excess of the two shown in FIG. 1, may be added for additional system throughput. In such a configuration, pivotable conveyor section 40 would be modified to sequentially align with each of the plurality of sealing stations.

One of the substantially identical sealing stations 50 is shown in detail in FIG. 2 as comprising conveyor 51, stop member 54, ram member 60, side railing 63, ultrasonic horn 70, and anvil 75. Although, in the preferred embodiments, ultrasonic energy is employed to seal bag 100, other sealing methods are also contemplated, including sealing by direct application of heat to an appropriate type of sealable valve.

Conveyor 51 comprises belt 52 and rollers 53. Stop member 54 is oriented substantially perpendicular to the direction of travel of conveyor belt 52, and is positionable from a substantially vertical, closed position (as shown in FIG. 2) to a substantially horizontal, open position (as shown in FIG. 3E), by rotation about pivots 55. Two flanges 56 are attached to stop member 54. Shaft 57 is positioned between and rotatably connected to flanges 56. Shaft 57 is also connected to piston 58, which is extendable and retractable with respect to stationary cylinder 59. When piston 58 is extended, stop member 54 is rotated to its substantially vertical, closed position. When piston 58 is retracted within stationary cylinder 59, stop member 54 is rotated to its substantially horizontal, open position.

Ram member 60 is oriented substantially parallel to the direction of travel of conveyor belt 52, and is moveable from a substantially undeployed position (as shown in FIG. 2) to a substantially deployed position (as shown in FIGS. 3C and 3D). Piston 61 is attached to ram member 60, and, in turn, is extendable and retractable with respect to stationary cylinder 62. When ram member 60 is in its undeployed position, piston 61 is retracted within stationary cylinder 62, and ram member 60 is substantially adjacent one side of belt 52. When piston 61 is extended from stationary cylinder 62, ram member 60 is in its substantially deployed position, and is extended over a portion of belt 52, to a distance approximately equal to the width of belt 52 minus the width of valved bag 100.

Side railing 63 is positioned substantially parallel to ram member 60, substantially adjacent an opposing side of belt 52.

Sealing station 50 further includes a sealing area, which is a region between ultrasonic horn 70 and anvil 75. Ultrasonic horn 70, which may comprise a conventional ultrasonic wave generator, is attached to piston 71, which, in turn, is extendable and retractable with respect to stationary cylinder 72. When piston 71 is retracted within stationary cylinder 72, ultrasonic horn 70 is in its substantially non-engaging position, as shown in FIG. 3C. When piston 71 is extended with respect to stationary cylinder 72, ultrasonic horn 70 is in its substantially engaging position, with respect to a sealable valve disposed within the sealing area, as shown in FIG. 3D.

Anvil 75 is rotatable from a substantially non-engaging position (FIG. 3A) to a substantially engaging position (FIG. 3D) with respect to a sealable valve disposed within the sealing area. Anvil 75 is attached to flange 76 which, in turn, is attached to and pivoted by rotating rod 77. The rotation of rod 77, and, in turn, anvil 75 between its substantially non-engaging and engaging orientations, may be governed by a conventional hydraulic, pneumatic, or electronic actuator.

The process of sealing a valved bag 100 within a sealing station 50 is shown in FIGS. 3A–3E. This process occurs within each of the substantially identical sealing stations 50. In FIG. 3A, a valved bag 100 is shown being transported along conveyor belt 52, towards stop member 54, in a direction substantially parallel to longitudinal axis 107 and with sealable valve 110 facing towards the sealing area. At this time, stop member 54 is in its substantially vertical, closed vertical position, and ram member 60 is in its substantially undeployed position. Moreover, ultrasonic horn 70 and anvil 75 are each in their respective non-engaging positions.

Valved bag 100 continues to travel along conveyor 51 until its forward travel is stopped by abutting contact with stop member 54, as shown in FIG. 3B. Belt 52 may be stopped at this time to avoid potential abrading of bag 100. Alternatively, belt 52 may be allowed to continue to move beneath stop member 54 and now-stationary valved bag 100. A conventional proximity sensor, such as an optical sensor, detects that valved bag 100 is abutting stop member 54, in order to trigger the next step of the sealing process.

Ram member 60 is next moved from its substantially undeployed position (as shown in FIG. 3B) to its substantially deployed position (as shown in FIG. 3C). This, in turn, causes ram member 60 to push valved bag 100 laterally and perpendicular to its longitudinal axis 107, until valved bag 100 abuts side railing 63. This, in turn, positions sealable valve 110 within the sealing area, between ultrasonic horn 70 and anvil 75. Next, as shown in FIG. 3D, anvil 75 is pivoted from its substantially non-engaging position to its substantially engaging position, engaging sealable valve 110. Ultrasonic horn 70 is likewise extended from its substantially non-engaging position to its substantially engaging position, engaging an opposing side of valve 110, relative to anvil 75. Accordingly, sealable valve 110 is clamped between ultrasonic horn 70 and anvil 75, as shown in detail in FIGS. 4 and 5. Ultrasonic horn 70 is then energized for a predetermined period of time, so as to generate ultrasonic vibrations within sealable valve 110. These ultrasonic vibrations heat inner ply or inner coating 108. Ultrasonic horn 70 is then de-energized, allowing inner ply 108 to cool. In this manner, valve 110 is sealed. A valve 110, sealed by the present invention, is shown in FIG. 6.

As shown in FIG. 3E, ram member 60 is next retracted to its substantially undeployed position. Ultrasonic horn 70 is moved to its substantially non-engaging position, as is anvil 75, unclamping sealable valve 110. Stop member 54 is moved to its substantially open position, resuming the forward transportation of valved bag 100 along conveyor 51. If belt 52 was previously stopped when valved bag 100 engaged stop member 54, belt 52 is now restarted. As shown in FIG. 1, once the sealing process is completed, the sealed valved bag 100 is transported to conveyor 91. For the upper sealing station 50, this transportation is by means of chute 90.

After a sufficient amount of time has elapsed, following the opening of stop member 54 and passage of bag 110 beyond stop member 54, or after a conventional proximity detector indicates that bag 110 has left sealing station 50, stop member 54 is returned to its substantially closed, upright position, so as to enable stop member 54 to again stop forward progress of the next valved bag 100 to be sealed within the present sealing station 50.

An alternative preferred embodiment of the present bag sealing apparatus is shown in FIG. 3F. In this preferred embodiment, anvil 75 need not be pivoted away from the sealing area, and from the forward progress of the sealed valve 110, following actuation of horn 70. Instead, side railing 63 is replaced with an additional ram member 80. Ram member 80 is attached to piston 81, which, in turn, is extendable and retractable with respect to stationary cylinder 82. As shown in FIG. 3F, following ultrasonic sealing of valve 110, ultrasonic horn 70 is moved to its non-engaging position. Ram member 60 is moved from its substantially deployed position to its substantially non-deployed position. Moreover, in this preferred embodiment, ram member 80 is moved from its substantially non-deployed position to its substantially deployed position, repositioning valved bag 100 by moving the bag laterally, perpendicular to its longitudinal axis 107, so as to remove valve 110 from the sealing area. In this manner, the forward progress of sealed valve 110 is no longer obstructed by anvil 75. Stop member 54 is then moved from its substantially closed position to its substantially open position, allowing valved bag 100 to proceed along conveyor 51, and ram member 80 is returned to its non-engaging position.

The foregoing description and drawings merely explain and illustrate the invention and the invention is not limited thereto except insofar as the appended claims are so limited, as those skilled in the art have the disclosure before them will be able to make modifications and variations therein without departing from the scope of the invention.

What is claimed is:

1. A method for sealing a freestanding valved bag containing articles therewithin, said valve bag being transported by a conveyor in a freestanding manner, said valve bag having a body with a longitudinal axis, said longitudinal axis extending substantially parallel to a longest dimension of said bag, said bag further having a first side portion extending substantially parallel to said longitudinal axis, said bag further having a first end, a center of gravity, and a sealable valve, disposed proximate said first end, at least a portion of said sealable valve protruding from said body, exteriorly of said first side portion, in a substantially perpendicular orientation relative to said longitudinal axis, said valved bag further having a second side portion extending substantially parallel to said longitudinal axis and, in turn, substantially parallel to said longest dimension of said bag, said method comprising the steps of:

orienting said freestanding valve bag on said conveyor in a freestanding manner, so that said rests with said second side portion on said conveyor, so as to minimize the distance between said center of gravity of said freestanding valved bag relative to a surface of said conveyor;

transporting said freestanding valved bag along said conveyor in a freestanding manner and in a direction of travel substantially parallel to said longitudinal axis of said freestanding valved bag;

stopping said transporting of said freestanding valved bag on said conveyor when said sealable bag is substantially aligned with a sealing area;

repositioning said freestanding valved bag to dispose at least a portion of said protruding sealable valve into said sealing area;

sealing said sealable valve to restrain said articles therewithin, through the direct application of externally applied forces to the protruding portion of said sealable valve and without the insertion of sealing apparatus into said sealable valve; and resuming said travel of said freestanding valved bag along said conveyor.

2. The method according to claim 1, wherein said sealing area includes an ultrasonic horn and an anvil, said step of sealing said freestanding sealable valve comprising the steps of:

clamping said at least a portion of said freestanding sealable valve between said ultrasonic horn and said anvil;

energizing said ultrasonic horn to seal said sealable valve;

de-energizing said ultrasonic horn; and unclamping at least one of said ultrasonic horn and said anvil from said at least a portion of said sealable valve.

3. A method for sealing a valved bag transported by a conveyor, said valved bag having a body with the longitudinal axis, said longitudinal axis extending substantially parallel to a longest dimension of said bag, said bag further having a first side portion extending substantially parallel to said longitudinal axis, said bag further having a first end, a center of gravity, and a sealed valve, disposed proximate said first end, at least a portion of said sealable valve protruding from said body, exteriorly of said first side portion, in a substantially perpendicular orientation relative to said longitudinal axis, said valved bag further having a second side portion extending substantially parallel to said longitudinal axis and, in turn, substantially parallel to said longest dimension of said bag said method comprising the steps of:

orienting said valved bag on said conveyor, so that said bag rest with said second side portion on said conveyor, so as to minimize the distance of said center of gravity of said valved bag relative to a surface of said conveyor;

transporting said valved bag along said conveyor in a direction of travel substantially parallel to said longitudinal axis of said valved bag;

stopping said transporting of said valved bag on said conveyor when said sealable valve is substantially aligned with a sealing area;

positioning said valved bag to dispose at least a portion of said protruding sealable valve into said sealing area;

sealing said sealable valve, through the direct application of externally applied forces to the protruding portion of said sealable valve and without the insertion of sealing apparatus into said sealable valve; and resuming said travel of said valved bag along said conveyor;

said sealing area including an ultrasonic horn and an anvil;

said step of sealing said sealable valve comprising the steps of:

clamping said at least a portion of said sealable valve between said ultrasonic horn and said anvil;

energizing said ultrasonic horn to seal said sealable valve;

de-energizing said ultrasonic horn; and unclamping at least of one of said ultrasonic horn and said anvil from said at least a portion of said sealable valve;

said step of clamping said at least a portion of said sealable valve between said ultrasonic horn and said anvil comprising the steps of moving said anvil into a forward path of at least a portion of said sealable valve and into engagement with a first side of said sealable valve; and engaging said ultrasonic horn with a second, opposing side of said sealable valve.

4. The method according to claim 2, wherein said step of unclamping at least one of said ultrasonic horn and anvil from said at least a portion of said sealable valve comprises the steps of:

disengaging said ultrasonic horn from a second side of said sealable valve; and removing said anvil from a forward path of said at least a portion of said sealable valve.

5. The method according to claim 1, wherein said step of resuming said transporting of said valved bag on said conveyor is preceded by a further step of repositioning said valved bag to remove said at least a portion of said protruding sealable valve from said sealing area.

6. A method for sealing a valved bag transported by a conveyor, said valved bag having a body with a longitudinal axis, a center of gravity, and a sealable valve, at least a portion of said sealable valve protruding from said body in a substantially perpendicular orientation relative to a said longitudinal axis, said method comprising the steps of:

orienting said valved bag on said conveyor so as to minimize the distance between said center of gravity of said valved bag relative to a surface of said conveyor;

transporting said valved bag along said conveyor in a direction of travel substantially parallel to said longitudinal axis of said valved bag;

stopping said transporting of said valved bag on said conveyor when said sealable valve is substantially aligned with a sealing area;

positioning said valved bag to dispose at least a portion of said protruding sealable valve into said sealing are;

sealing said sealable valve; and resuming said travel of said valved bag along said conveyor;

said step of orienting said valved bag on said conveyor with the distance between said center of gravity of valved bag minimized relative to the surface of said conveyor further including the step of dropping said valved bag onto said conveyor, said dropping of said valved bag serving to substantially expel residue from and substantially close and sealable valve, while automatically positioning said valved bag in said lower center of gravity orientation.

7. A bag sealing apparatus for sealing a freestanding valved bag containing articles therewithin, said valved bag being transported in a freestanding manner by a conveyor, said freestanding valved bag having a body with a longitudinal axis, said longitudinal axis extending substantially parallel to a longest dimension of said bag, said bag further having a first side portion extending substantially parallel to said longitudinal axis, said bag further having a first end, a center of gravity, and a sealable valve, disposed proximate said first end, at least a portion of said sealable valve protruding from said body, exteriorly of said first side portion, in a substantially perpendicular orientation relative to said longitudinal axis, said valved bag further having a second side portion extending substantially parallel to said longitudinal axis and, in turn, substantially parallel to said longest dimension of said bag, said bag sealing apparatus comprising:

orienting means for orienting said freestanding valved bag on said conveyor in a freestanding manner, so that said bag rests with said second side portion on said conveyor, so as to minimize the distance between said center of gravity of said freestanding valved bag relative to a surface of said conveyor;

transporting means for transporting said freestanding valved bag along said conveyor in a freestanding manner in a direction of travel substantially parallel to said longitudinal axis of said freestanding valved bag;

stopping means for stopping said transporting of said freestanding valved bag along said conveyor when said sealable valve is substantially aligned with a sealing area;

repositioning means for reposition said freestanding valved bag relative said conveyor to dispose at least a portion of said sealable valve into said sealing area;

sealing means for said sealable valve to restrain said articles therewithin when said at least a portion of said sealable valve is disposed within said sealing area said sealing means being configured so as to seal said sealable valve through the direct application of externally applied forces to the protruding portion of said sealable valve and without the insertion of sealing apparatus into said sealable valve; and transport resumption means for resuming said transporting of said freestanding valved bag on said conveyor.

8. The bag sealing apparatus according to claim 7, wherein said stopping means comprises a stop member positionable from a substantially open position to a substantially closed position, engagement of said valved bag with said stop member in said substantially closed position temporarily stopping forward travel of said valved bag, when said sealable valve is substantially aligned with said sealing area.

9. The bag sealing apparatus according to claim 7, wherein said positioning means comprises a ram member movable from a substantially undeployed position to a substantially deployed position, movement of said ram member from said substantially undeployed position to said substantially deployed position in turn positioning said valved bag to dispose at least a portion of said sealable valve into said sealing area.

10. The bag sealing apparatus according to claim 7, wherein said sealing means comprises an ultrasonic horn and an anvil, at least one of said ultrasonic horn and anvil being moveable from a substantially non-engaging position to a substantially engaging position relative to said sealable valve, engagement of sealable valve by said ultrasonic horn and said anvil and actuation of said ultrasonic horn serving to substantially seal said sealable valve.

11. A bag sealing apparatus for sealing a valved bag transported by a conveyor, said valved bag having a body with a longitudinal axis, said longitudinal axis extending substantially parallel to a longest dimension of said bag, said bag further having a first side portion extending substantially parallel to said longitudinal axis, said bag further having a first end, a center of gravity, and a sealable valve, disposed proximate said first end, at least a portion of said sealable valve protruding from said body, exteriorly of said first side portion, in a substantially perpendicular orientation relative to said longitudinal axis, said valved bag further having a second side portion extending substantially parallel to said longitudinal axis and, in turn, substantially parallel to said longest dimension of said bag, said bag sealing apparatus comprising:

orienting means for orienting said valved bag on said conveyor, so that said bag rests with said side portion on said conveyor, so as to minimize the distance between said center of gravity of said valved bag relative to a surface of said conveyor;

transporting means for transporting said valved bag along said conveyor in a direction of travel substantially parallel to said longitudinal axis of said valved bag;

stopping means for stopping said transporting of said valved bag along said conveyor when said sealable valve is substantially aligned with a sealing area;

positioning means for positioning said valved bag to dispose at least a portion of said sealable valve into said sealing area;

sealing means for sealing said sealable valve when said at least a portion of said sealable valve is disposed within said sealing area, said sealing means being configured so as to seal said sealable valve through the direct application of externally applied forces to the protruding portion of said sealable valve and without the insertion of sealing apparatus into said sealable valve; and transport resumption means for resuming said transporting of said valved bag on said conveyor, wherein said sealing means comprises a ultrasonic horn and an anvil at least one of said ultrasonic horn and anvil being moveable from a substantially non-engaging position to a substantially engaging position relative to said sealable valve, engagement of sealable valve by ultrasonic horn and said anvil and actuation of said ultrasonic serving to substantially seal said sealable valve, and said anvil being movable from substantially non-engaging position to said substantially engaging position relative to said sealable valve, said anvil being in a forward path of said sealable valve when in said substantially engaging position and being removed from said forward path of said sealable valve when in said substantially non-engaging position.

12. The bag sealing apparatus according to claim 7, wherein said transport resumption means comprises a stop member positionable from a substantially closed position to a substantially open position, movement of said stop member from said substantially closed position to said substantially open position permitting a valved bag abutting said stop member to resume said travel along said conveyor.

13. The bag sealing apparatus according to claim 7, wherein said bag sealing apparatus further includes repositioning means for repositioning said valved bag to remove said at least a portion of said protruding sealable valve from said sealing area.

14. The bag sealing apparatus according to claim 13, wherein said repositioning means comprises a ram member movable from a substantially undeployed position to a substantially deployed position, movement of said ram member from said substantially undeployed position to said substantially deployed position repositioning said valved bag, and, in turn, removing said at least a portion of said sealable valve from said sealing area.

15. The bag sealing apparatus according to claim 7, wherein said bag sealing apparatus further includes a plurality of sealing stations, and delivery means for delivering said valved bags to said sealing stations.

16. A bag sealing apparatus for sealing a valved bag transported by a conveyor, said valved bag having a body with a longitudinal axis, a center of gravity, and a sealable valve, at least a portion of said sealable valve protruding from said body in a substantially perpendicular orientation relative to said longitudinal axis, said bag sealing apparatus comprising:

orienting means for orienting said valved bag on said conveyor so as to minimize the distance between said center of gravity of said valved bag relative to a surface of said conveyor;

transporting means for transporting said valved bag along said conveyor in a direction of travel substantially parallel to said longitudinal axis of said valved bag;

stopping means for stopping said transporting of said valved bag along said conveyor when said sealable valve is substantially aligned with a sealing area;

positioning means for positioning said valved bag to dispose at least a portion of said sealable valve into said sealing area;

sealing means for sealing said sealable valve when said at least a portion of said sealable valve is disposed within said sealing area; and.

transport resumption means for resuming said transporting of said valved bag on said conveyor, wherein said bag sealing apparatus further includes a plurality of sealing stations, and delivery means for delivering said valved bags to said sealing stations, said plurality of sealing areas comprising two sealing stations, and said delivery means comprising a pivotable conveyor section alternately alignable with each of said two sealing stations.

17. A bag sealing apparatus for sealing a valved bag transported by a conveyor, said valved bag having a body with a longitudinal axis, a center of gravity, and a sealable valve, at least a portion of said sealable valve protruding from said body in a substantially perpendicular orientation relative to said longitudinal axis, said bag sealing apparatus comprising:

orienting means for orienting said valved bag on said conveyor so as to minimize the distance between said center of gravity of said valved bag relative to a surface of said conveyor;

transporting means for transporting said valved bag along said conveyor in a direction of travel substantially parallel to said longitudinal axis of said valved bag;

stopping means for stopping said transporting of said valved bag along said conveyor when said sealable valve is substantially aligned with a sealing area;

positioning means for positioning said valved back to dispose at least a portion of said sealable valve into said sealing area;

sealing means for sealing said sealable valve when said at least a portion of said sealable valve is disposed within said sealing area; and transport resumption means for resuming said transporting of said valved bag on said conveyor, said bag sealing apparatus further including dropping means for dropping said valved bag onto said conveyor, said dropping of said valved bag serving to substantially expel residue from and substantially close said sealable valve, while automatically positioning said valved bag in said low center of gravity orientation.

* * * * *

UNITED STATES PATENT AND TRADEMARK OFFICE
CERTIFICATE OF CORRECTION

PATENT NO. : 5,620,542
DATED : April 15, 1997
INVENTOR(S) : Michael R. Avila et al.

It is certified that error appears in the above-indentified patent and that said Letters Patent is hereby corrected as shown below:

| | |
|---|---|
| Col. 9, Line 18 | After "that said" insert --bag-- |
| Col. 9, Line 59 | Delete "sealed" and insert instead --sealable-- |
| Col. 10, Line 2 | Delete "rest" and insert instead "rests" |
| Col. 11, Line 2 | Delete "are;" and insert instead "area;" |
| Col. 11, Line 52 | Delete "area said" and insert instead "area, said" |
| Col. 12, Line 33 | After "with said" insert --second-- |
| Col. 14, Line 3 | Delete "and." and insert instead "and" |
| Col. 14, Line 32 | Delete "back" and insert instead "bag" |

Signed and Sealed this

Tenth Day of February, 1998

Attest:

BRUCE LEHMAN

Attesting Officer

Commissioner of Patents and Trademarks